United States Patent
Ville et al.

[15] 3,663,229
[45] May 16, 1972

[54] PHOTOGRAPHIC ELEMENTS CONTAINING CARBOXYALKYL POLYGLYCOL ETHERS AND ESTERS

[72] Inventors: Frans Jan Ville, Mortsel; Jozef Frans Willems; Hendrir Adolf Pattijn, both of Wilrijk, all of Belgium

[73] Assignee: Gevaert-AGFA N.V., Mortsel, Belgium

[22] Filed: Sept. 15, 1967

[21] Appl. No.: 668,189

[30] Foreign Application Priority Data

Oct. 12, 1966 Great Britain.....................45,670/66

[52] U.S. Cl..............................96/67, 96/114.1, 96/114.5
[51] Int. Cl..........................................................G03c 1/76
[58] Field of Search....................96/114.5, 67; 106/125, 135

[56] References Cited

UNITED STATES PATENTS

| | | | |
|---|---|---|---|
| 3,003,877 | 10/1961 | McLaughlin | 106/125 |
| 3,392,020 | 7/1968 | Yutzy | 96/114.1 |
| 3,415,649 | 12/1968 | Nishio | 106/125 |
| 3,038,804 | 6/1962 | Knox | 96/114.5 |

FOREIGN PATENTS OR APPLICATIONS 976,084  11/1964  Great Britain

*Primary Examiner*—Norman G. Torchin
*Assistant Examiner*—Judson R. Hightower
*Attorney*—Robert F. Conrad and Alfred W. Breiner

[57] ABSTRACT

Photographic silver halide elements comprising a support and a water permeable colloid layer including as a coating aid at least one compound of the general formula:

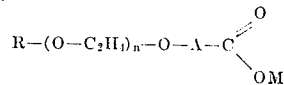

A is a methylene group or an ethylene group,

R is a hydrocarbon radical, or an aliphatic carboxylic acyl radical, $n$ is an integer up to 40, and M is hydrogen, an alkali metal atom, ammonium or an organic amine, are described. These photographic elements do not exhibit hydrophobic inclusions which lead to repellency spots or comets.

12 Claims, No Drawings

PHOTOGRAPHIC ELEMENTS CONTAINING CARBOXYALKYL POLYGLYCOL ETHERS AND ESTERS

This invention relates to film-forming coating compositions comprising a hydrophilic colloid and a carboxyalkylated polyethylene glycol ether or ester as coating aid.

In the application of film-forming coating compositions comprising a hydrophilic colloid to surfaces, particularly in the photographic industry, it is desirable to apply such coating compositions uniformly and at good production speeds. In many cases it is even desirable to apply such coatings over other previous layers, which are either wet or dry.

It is necessary, in the photographic industry, that colloid compositions ready for coating are entirely hydrophilic in order to obtain a uniform layer therewith comprising no hydrophobic inclusions leading to repellency spots or comets in the said layer. Moreover, the entire surface of a layer formed from such colloid compositions should be hydrophilic so that said layer can be rewet readily either by the processing solutions if said layer is the top layer of a photographic material to be processed, or by the coating composition which will be applied to said layer for forming a next layer. Indeed, during processing air-bells are more easily carried along by a hydrophobic surface than by a hydrophilic surface, which air-bells will manifest themselves as small undeveloped areas in the processed material; moreover, on drying of the material after processing and occasionally retouching of the processed material, water will be repelled and contract the more strongly according as the surfaces are the more hydrophobic, which will give rise to a non-uniform drying and to poor retouchability respectively. In the case the layer formed from the said colloid composition is overcoated with a next layer, the maximum speed of the moving layer to be overcoated at which no repellency occurs can be increased according as the surface to be overcoated is more hydrophilic; local hydrophobic areas at the surface of the layer to be overcoated can give rise to the formation of so-called repellency spots or comets in the said next layer.

Thus, in order to eliminate all these possible coating defects such as air bubbles, repellency spots or "comets" and unevennesses the use of coating aids has been widely adopted.

Up till now saponin was conventionally used as coating aid for coating compositions comprising hydrophilic colloids. This product, however, may vary markedly from batch to batch and is much more expensive than synthetic coating aids. Moreover it may adversely affect the photographic properties of an emulsion containing it.

A number of synthetic coating aids have been proposed to improve coating of compositions comprising hydrophilic colloids more particularly gelatin layers. However, most coating aids, while improving some properties of the layer, also adversely affect other desired properties. For instance some coating aids, prevent the formation of "comets" in gelatin layers but it is difficult to overcoat layers containing such coating aids when in wet state; moreover suchlike coating aids will tend to form air-bells on the surface of a photographic emulsion layer during processing in automatic machines and prevent uniform drying of the layer after processing. In order to overcome these disadvantages it has been proposed to use mixtures of coating aids having different properties.

It has now been found that carboxyalkyl polyglycol ethers and esters as well as salts thereof corresponding to the following general formula:

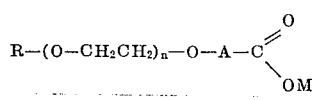

wherein:
A represents methylene including methylene substituted by lower alkyl, or ethylene,
$n$ represents an integer from 1 to 40, and
M stands for hydrogen, an alkali metal such as sodium or potassium, ammonium or an organic amine, e.g. diethanolamine, triethanolamine, morpholine, and R represents an aliphatic carboxylic acyl radical or a hydrocarbon radical including substituted hydrocarbon, more particularly an aliphatic straight-chain or branched radical, in particular an alkyl or alkylene radical with six to 24 and preferably an alkyl or alkylene radical with 10 to 18 carbon atoms, or an alkylaryl radical, in which the aryl radical may be mononuclear or multinuclear, e.g. an alkylated phenyl or naphthyl radical, and in which the alkyl radical contains preferably four to 10 carbon atoms when the aryl radical is naphthyl and six to 14 carbon atoms when the aryl radical is phenyl, are excellent coating aids for use in coating compositions comprising a hydrophilic film-forming colloid.

The compounds corresponding to the above general formula can be prepared according to methods analogous to those described by Dr. J.G. Aalbers in "Lauryl (poly-1-oxapropene)oxaethane carboxylic acids", offered by CHEMY N.V., Bodegraven, Holland. They can be prepared, e.g., by condensing the appropriate alcohol or acid with ethylene oxide and then carboxy alkylating the resulting polyglycol ether or ester alcohol by reaction with the appropriate α-halo-carboxylic acid, β-halo-propionic acid or salts of these acids.

Examples of suitable coating aids corresponding to the above general formula are:

1. $H_3C-(CH_2)_{11}-(O-CH_2-CH_2)_{30}-O-CH_2-COOH$
2. $H_3C-(CH_2)_{15}-(O-CH_2-CH_2)_{20}-O-CH_2-COOH$
3. $H_3C-(CH_2)_7-CH \quad CH-(CH_2)_7-CH_2-(O-CH_2-CH_2)_4o-ch_2-COOH$
4. $H_3C-(CH_2)_7-CH \quad CH-(CH_2)_7-CH_2-(O-CH_2-CH_2)_9o-ch_2-COOH$
5. $H_3C-(CH_2)_7-CH \quad CH-(CH_2)_7-CH_2-(O-CH_2-CH_2)_{10}-O-CH_2-COOH$
6. $H_3C-(CH_2)_{16}-CH_2-(O-CH_2-CH_2)_4-O-CH_2-COOH$
7. $H_3C-(CH_2)_{16}-CH_2-(O-CH_2-CH_2)_{10}-O-CH_2-COOH$
8. $H_3C-(CH_2)_{16}-CH_2-(O-CH_2-CH_2)_9-O-CH_2-COOH$ 9. 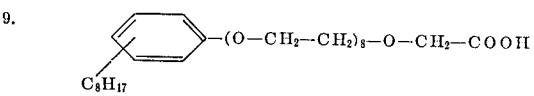

10. 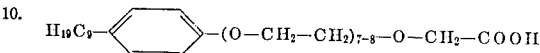

11. 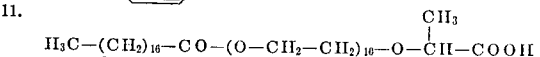

Further examples of suitable coating aids corresponding to the above general formula can be found in German Pat. Application (DAS) No. 1,057,785 and British Pat. No. 976,084.

Coating compositions containing the coating aids corresponding to the above general formula can be applied to dry surfaces as well as to wet surfaces and form layers that can be easily overcoated in wet as well as in dry state, the said layers being either light-sensitive layers or not. The coating aids according to the present invention have good anticomet properties and thus prevent the formation of repellency spots and give less rise to foaming and resulting air-bubbles than saponin and other conventional synthetic coating aids; said foaming mainly results from the presence of sulfate or sulfonate groups in the latter coating aids.

The coating aids of use according to the present invention can also be used in combination with other coating aids e.g. coating aids that strongly reduce repellency spots but that render the layer containing them difficult to overcoat. By the presence of the coating aids according to the present invention the latter disadvantage is overcome and the mentioned strong reduction of repellency spots formation is maintained. Moreover, the coating aids according to the present invention have also favorable dispersing or emulsifying properties so that they can be used for dispersing or emulsifying substances in hydrophilic colloid compositions, which as a result of the presence of said coating aids also show improved coating characteristics. For instance they are suitable as dispersing agent or emulsifying agent for substances that are to be incorporated into layers comprising a hydrophilic colloid and that would give rise to the formation of repellency spots in said layers when no compounds according to the invention were present. Other properties of the coating aids according to the present invention will appear hereinafter.

Although the coating aids according to the present invention are mainly intended for use in coating compositions comprising gelatin as hydrophilic colloid, they can also be used as coating aid for coating compositions comprising other colloidal materials or mixtures of them, e.g. hydrophilic natural colloids, modified hydrophilic natural colloids or synthetic hydrophilic polymers. More particularly these colloids may be selected of such film-forming natural or modified natural hydrophilic colloids as, e.g., glue, casein, zein, hydroxyethyl-cellulose, carboxymethyl-cellulose, methyl-cellulose, carboxymethyl-hydroxyethyl-cellulose, gum arabic, sodium alginate and hydrophilic derivatives of such colloids. They may also be selected of such synthetic hydrophilic polymers as e.g. polyvinyl alcohol, poly-N-vinyl pyrrolidone, polyvinyl amine, polyethylene oxide, polystyrene sulfonic acid, polyacrylic acid, and hydrophilic copolymers and derivatives of such polymers. In this connection reference is made, e.g., to our United Kingdom Pat. Applications No. 48,128/63 and 1350/66 which relate among others to heat- and/or pressure-sensitive materials comprising a recording layer mainly consisting of a dispersion of hydrophobic thermoplastic polymer particles in a hydrophilic colloid binder.

The compounds according to the above general formula are good coating aids for use in coating compositions as defined above either alone or in admixture with other coating aids e.g. dialkyl sulfosuccinic acid salts, salts of alkyl or alkylaryl polyether sulfates and sulfonates, etc. It has been found that coating aids according to the present invention improve the coating characteristics of coating compositions already at a concentration as low as 0.01 by weight relative to the weight of solids. Larger concentrations, however, can also be used but generally the concentration is not higher than 5 percent by weight based on the weight of solids. In coating compositions intended for being coated as hydrophilic colloid layers in photographic silver halide materials said coating aids are generally present in amounts from 0.01 to 2 percent based on the weight of dry colloid.

The coating aids according to the invention are particularly suitable for use in a coating composition comprising gelatin as hydrophilic colloid, either as an aqueous solution of gelatin or as a photographic emulsion which ordinarily is composed of an aqueous solution of gelatin containing as the light-sensitive material therein, a silver halide such as silver bromide, silver chloride, silver iodide, or mixtures thereof or another light-sensitive substance. The emulsion may contain other added substances such as sensitizing dyes, hardeners, stabilizers, pH-adjusting compounds, color couplers, antifogging agents, development accelerators, thickening agents, developing agents, softening agents, or the like. For instance, the coating aids of the invention are useful in gelatin photographic emulsions, not only those which are non optically sensitized, but also in orthochromatic and panchromatic emulsions. This also includes gelatin emulsions intended for color photography such as those containing color forming couplers.

The coating aids corresponding to the above general formula and their mixtures with other coating aids are also very useful in various other types of coating compositions in which gelatin is an important constituent, for example, in gelatin coating compositions to be applied as antihalation layer to the back-side or front-side of the base in a photographic material, as protective layer, as filter layer, as intermediate layer, as anticurling layer etc., which layers can also contain all kinds of other ingredients such as filling agents, hardening agents, antistatic agents, antifriction agents, or in any type of gelatin layer, which is coated from a composition comprising an aqueous solution of gelatin.

The coating compositions in accordance with our invention may be coated on a transparent support e.g. of glass, cellulose esters, polyethylene terephthalate or on a nontransparent reflecting material such as of paper or an opaque cellulose ester. It is often desirable first to coat a subbing layer to the support, this practice of subbing being well known in the art.

The coating procedure may comprise any of the standard procedures employed in the industry, such as roller coating, brush coating, dip-coating, spraying, using a doctor blade or an air blade to control the thickness and distribution of the coating composition.

The following examples illustrate the present invention.

EXAMPLE 1

A series of five conventional gelatin silver chloride emulsion samples all having the same composition was prepared. To four of these samples a certain amount of coating aid was added as listed in the following table whereas to one of these samples no coating aid at all was added. These five emulsions were then coated on a baryta coated paper support with grained surface whereupon the emulsion layers formed were overcoated while still wet with a protective gelatin layer containing only saponin as coating aid.

In each case the "critical speed" for applying the protective layers on the wet emulsion layers was determined and the number of repellency spots i.e., "comets" per sq.m. were counted for each material. The results obtained are listed in the following table.

| Coating aid used in the emulsion and concentration thereof in % by weight of dry gelatin | Critical Speed in m/min | Repellency spots per sq.m. |
| --- | --- | --- |
| none | 4 | 10 |
| 0.2 % of saponin | 4 | 1 |
| 0.01 % of coating aid of formula 8 above | 7 | 1 |
| 0.025 % of coating aid of formula 8 above | 16 | 0 |
| 0.05 % of coating aid of formula 8 above | 20 | 0 |

As can be seen from the results listed in the table the critical speed increases markedly and the number of "comets" decreases when using a coating aid according to the present invention.

By "critical speed" is understood the maximum speed of the moving base to be coated, at which the composition for forming the protective layer can still be coated. Indeed, the layers of air carried along by the moving base are capable, at a certain speed, of preventing in large areas, contact of the material to be coated with the wet emulsion layer whereby uncoated portions remain on the moving emulsion layer. On decreasing the speed of coating, contact of the emulsion layer with the protective gelatin layer takes place over the entire area, the instability of the coated layer, because of the incomplete wetting of the base, does not occur and uniformity of the layer thickness is maintained.

EXAMPLE 2

A series of fine-grain gelatino silver halide emulsions intended for being coated on a film support and all having the same composition, was prepared. To each of these emulsion samples a certain amount of coating aid or mixture of coating aids was added as listed in the following table, except for one sample to which no coating aid at all was added. After having been coated on a conventional film support the emulsion layers were overcoated with a protective gelatin layer. In each case the critical speed for applying the protective layers on the wet emulsion layers was determined and the number of repellency spots per sq.m. were counted for each material. The results obtained are listed in the following table.

| Coating aid used in the emulsion and concentration thereof in % by weight of dry gelatin | Critical speed in m/min | Repellency spots per sq.m. |
| --- | --- | --- |
| none | 15 | 50 |
| 0.2 % of saponin | 15 | 15 |
| 0.01 % of sodium isotetradecyl sulphate | 4 | 2 |
| 0.01 % of sodium isotetradecyl sulphate + 0.01 % of coating aid of formula 9 above | 16 | 2 |
| 0.01 % of sodium isotetradecyl sulphate + 0.025 % of coating aid of formula 9 above | 38 | 3 |
| 0.01 % of sodium isotetradecyl sulphate + 0.05 % of coating aid of formula 9 above | 40 | 2 |

From the results listed in the table the following can be learned. The formation of repellency spots is reduced when replacing saponin by sodium isotetradecyl sulfate as coating aid. The latter coating aid however, has the disadvantage of lowering the critical speed markedly, which means that the emulsion layer becomes difficult to overcoat. As can be seen by the use of a combination of sodium isotetradecyl sulfate and a coating aid according to the present invention the critical speed is markedly increased while the number of "comets" remains low.

EXAMPLE 3

A series of six viscous photographic gelatino silver halide emulsions, all having the same composition, was prepared. To each of these emulsion samples a certain amount of coating aid was added as listed in the following table.

After having been coated on a conventional film support the number of repellency spots in the layers was counted and the uniformity of the resulting emulsion layers was estimated visually, and given a certain value from 0 to 4 wherein 4 stands for poor uniformity and 0 for an excellent uniformity; the values lower than 1 stand for very good and those from 1 to 2 for good. The results obtained are listed in the following table.

| coating aid used in the emulsion layer and concentration thereof in % by weight of dry gelatin | Uniformity | Repellency spots/sq.m. |
| --- | --- | --- |
| 0.2 % of saponin | 2 | 16 |
| 0.01 % of coating aid of formula 1 above | 2 | 8 |
| 0.02 % of coating aid of formula 1 above | 1.5 | 6 |
| 0.03 % of coating aid of formula 1 above | 1 | 4 |
| 0.05 % of coating aid of formula 1 above | 0.5 | 3 |
| 0.1 % of coating aid of formula 1 above | 0.5 | 1 |

From the results obtained it appears that coating aids according to the present invention give rise to very good uniformity of the layer and less formation of comets.

EXAMPLE 4

A series of three gelatin coating compositions A, B and C for forming antihalation layers was prepared, said coating compositions comprising as dispersed antihalation dye the compound corresponding to the formula:

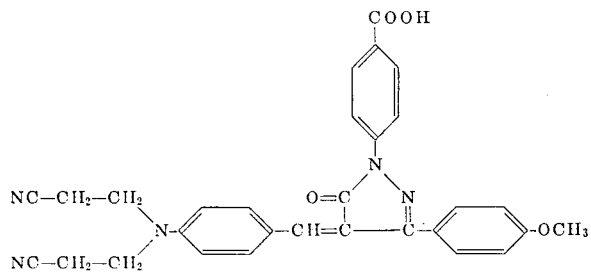

and oleyl tauride as dispersing agent therefor. To the gelatin coating compositions B and C a known coating aid was added namely saponin and sodium dioctyl sulfosuccinate respectively.

Then a series of three completely analogous gelatin coating compositions D, E and F were prepared with the difference, however, that the oleyl tauride was replaced by the coating aid of formula 9 above.

Each of these emulsion compositions A to F was coated on a conventional film support and the number of repellency spots per sq.m. formed in the resulting antihalation layers A to F were counted.

The results are listed in the following table.

| Antihalation layer | Repellency spots per sq.m. |
| --- | --- |
| A | 58 |
| B | 57 |
| C | 49 |
| D | 53 |
| E | 20 |
| F | 0 |

From the results listed in the table the following can be deduced. The presence of the antihalation dye strongly promotes the formation of comets and this formation of comets can be reduced only a little by the addition of known coating aids. However, when using as dispersing agent a coating aid according to the present invention and in combination therewith known coating aids the "repellency spots" formation is markedly reduced, the combination with sodium dioctyl sulfosuccinate giving best results.

EXAMPLE 5

A poly(ethylene terephthalate)support of 0.1 mm thickness provided with a subbing layer for gelatin is coated with the following composition pro rata of 30 g per sq.m.:

| | |
| --- | --- |
| 10 % aqueous gelatin solution | 400 g. |
| 40 % aqueous dispersion of polyethylene having a particle size of less than 0.1 $\mu$ and an average molecular weight comprised between 15,000 and 30,000 | 320 g. |
| water | 240 g. |
| 10 % aqueous solution of the coating aid of formula 9 above | 40 g. |
| 4 % aqueous formaldehyde | 20 g. |

The uniform and stable interlayer thus obtained is dried at 30° C.

On this layer a heat-sensitive layer, for use in a washing-away development by rubbing with a cotton pad soaked with water of 20° C., is coated pro rata of 30 g per sq.m. from the following composition:

| | |
| --- | --- |
| 10 % aqueous solution of polyvinyl alcohol | 45 g. |
| 40 % aqueous dispersion of polyethylene having a particle size of less than 0.1 $\mu$ and an average molecular weight comprised between 15,000 and 30,000 | 60 g. |
| water | 320 g. |
| aqueous carbon dispersion containing pro 100 g 53 g of carbon (average particle size 0.1 $\mu$), 23 g of water, 18 g of glycol and 6 g of the coating aid of formula 9 above | 8 g. |
| 10 % aqueous solution of the coating aid of formula 9 | 8 g. |

The uniform heat-sensitive layer obtained shows no coating defects.

The material obtained is further treated and used as described in our co-pending applications Nos. 48,128/63 and 1350/66.

We claim:

1. A photographic element comprising a support and at least one water permeable colloid layer including at least one light-sensitive silver halide emulsion layer wherein at least one of said layers includes a compound of the general formula:

$$R-(O-C_2H_4)_n-O-A-C{\overset{O}{\underset{OM}{\diagdown}}}$$

in which
A is a methylene group or an ethylene group,
R is a hydrocarbon radical, or an aliphatic carboxylic acyl radical,
$n$ is an integer up to 40, and
M is hydrogen, an alkali metal atom, ammonium or an organic amine.

2. The photographic element of claim 1 wherein the water permeable colloid is gelatin.

3. The photographic element of claim 2 wherein R is alkyl or alkylene comprising from 10 to 18 carbon atoms, or alkylaryl in which the alkyl radical comprises from four to 14 carbon atoms.

4. The photographic element of claim 2 wherein the coating aid is present in an amount of from 0.01 to 5 percent by weight based on the weight of the water permeable colloid.

5. The photographic element of claim 4 wherein the said coating aid is present in an amount of from 0.01 to 2 percent by weight based on the weight of the water permeable colloid.

6. The photographic element of claim 2 wherein said water permeable colloid layer also includes a coating aid selected from dialkyl sulfosuccinic acid salts, salts of alkyl or alkylaryl polyether sulfates and sulfonates.

7. A material sensitive to heat or pressure comprising a recording layer including a dispersion of hydrophobic thermoplastic polymer particles in a hydrophilic colloid binder and containing at least one compound of the general formula:

$$R-(O-C_2H_4)_n-O-A-C{\overset{O}{\underset{OM}{\diagdown}}}$$

in which:
A is a methylene group or an ethylene group,
R is a hydrocarbon radical, or an aliphatic carboxylic acyl radical,
$n$ is an integer up to 40, and
M is hydrogen, an alkali metal atom, ammonium or an organic amine.

8. The photographic element of claim 7 wherein the water permeable colloid is gelatin.

9. The photographic element of claim 8 wherein R is alkyl or alkylene comprising from 10 to 18 carbon atoms, or alkylaryl in which the alkyl radical comprises from four to 14 carbon atoms.

10. The photographic element of claim 8 wherein the coating aid is present in an amount of from 0.01 to 5 percent by weight based on the weight of the water permeable colloid.

11. The photographic element of claim 10 wherein said coating aid is present in an amount of from 0.01 to 2 percent by weight based on the weight of the water permeable colloid.

12. The photographic element of claim 8 wherein said water permeable colloid layer also includes a coating aid selected from dialkyl sulfosuccinic acid salts, salts of alkyl or alkylaryl polyether sulfates and sulfonates.

* * * * *